United States Patent [19]

Dalziel

[11] 3,890,643

[45] June 17, 1975

[54] FLEXIBLE DISK DRIVE CARTRIDGE LOADING APPARATUS

[75] Inventor: Warren L. Dalziel, Monte Sereno, Calif.

[73] Assignee: Shugart Associates, Sunnyvale, Calif.

[22] Filed: July 12, 1973

[21] Appl. No.: 378,549

[52] U.S. Cl. .................... 360/99

[51] Int. Cl. .................... G11b 17/04; G11b 5/82

[58] Field of Search .................... 360/99, 97, 98, 86; 206/62 P

[56] References Cited

UNITED STATES PATENTS

| | | | |
|---|---|---|---|
| 3,770,908 | 11/1973 | Craggs | 360/99 |
| 3,815,150 | 6/1974 | Stoddard et al. | 360/99 |

*Primary Examiner*—Bernard Konick
*Assistant Examiner*—Robert S. Tupper
*Attorney, Agent, or Firm*—Schatzel and Hamrick

[57] ABSTRACT

Flexible disk cartridge loading apparatus including a disk drive chassis, a guide plate having one side pivoted to the chassis and the opposite side attached for a closure for closing a cartridge receiving slot and for rotating the guide plate about its pivoted side and into a drive loading position, an ejector mechanism which is cocked as the cartridge is inserted through the slot, and is released to eject the cartridge through the slot as the closure is later opened, and precision camming surfaces which cooperate with the closing of the guide plate to accurately position the cartridge relative to a drive spindle as the drive plate is rotated into the drive loading position.

20 Claims, 8 Drawing Figures

FLEXIBLE DISK DRIVE CARTRIDGE LOADING APPARATUS

BACKGROUND OF THE INVENTION

1. Field of the Invention

The present invention relates generally to magnetic recording/playback apparatus and more particularly to an improved flexible disk drive cartridge loading apparatus having means for receiving a flexible disk cartridge, accurately positioning the cartridge relative to a drive spindle, and then ejecting the cartridge from the apparatus.

2. Description of the Prior Art

The flexible disc recording medium, sometimes called a floppy disk or diskette cartridge, is a Mylar disk enclosed in a plastic envelope having apertures for enabling the disk to be driven and to have magnetic data recorded or read out from the disk. The cartridge drive unit for receiving and making functional use of the cartridge typically consists of a drive mechanism, a read/write head, and means for receiving and loading the cartridge onto the drive mechanism and read/write head.

In prior art apparatus of this type a door is opened and the cartridge is inserted horizontally or dropped vertically into a slot between a drive spindle and a clamping structure and the clamping structure then clamps the cartridge against the drive spindle. Vertical insertion is relatively easy and fool-proof since the bottom of the receptacle serves tó align the cartridge relative to the spindle. However, horizontal insertion does not provide positive cartridge registration and the disk may be damaged if the door is closed with the cartridge slightly misregistered. Disk removal is difficult in both horizontal and vertical embodiments since the cartridge is carried inside the drive housing and the operator must reach into an opening with thumb and forefinger to extract the cartridge or to read the cartridge identification label.

Some prior art devices utilize a cartridge guide to direct the cartridge during insertion and to strip the disk from the spindle during removal. In such devices the door is typically affixed to the cartridge guide by means of cams or linkages so that when the door is closed the cartridge is moved into registration with the drive spindle. However, these devices rarely provide for accurate disk-spindle alignment. Consequently, since the cartridges are somewhat fragile and subject to wear and damage from mistreatment, the useful life of a cartridge is less than it could be if accurate alignment was provided.

SUMMARY OF THE INVENTION

It is therefore a principle object of the present invention to provide a cartridge loading apparatus which is capable of providing accurate alignment of the disk with the drive spindle and permits the disk to be inserted and removed in a convenient manner without detrimentally distorting the disk.

Briefly, a preferred embodiment of the present invention includes a cartridge guide structure, a cartridge registering means and a cartridge ejector mechanism. The cartridge guide structure is pivoted as its rearmost edge to the drive system chassis and carries the cartridge ejecting mechanism. The ejecting mechanism is cocked by insertion of the cartridge and thereby insures that the cartridge is fully received within the apparatus and properly positioned relative to the registering means which forms a part of the chassis. As the guide structure is pivoted toward the drive spindle and into a latched, loaded position, an edge of the cartridge engages the registering means and is accurately moved into registry with the spindle. When a release bar is depressed and the guide structure is allowed to swing away from the spindle unloading the cartridge, the ejecting mechanism engages the cartridge and ejects it part way out of the housing.

One advantage of the present invention is that because of the position registration of disk and spindle, the disk drive unit can be used equally as effectively in both horizontal or vertical applications.

Another advantage of the present invention is that it includes means for providing precision registration of cartridge and drive spindle yet requires no movable precision components.

Yet another advantage of the present invention is that the cartridge is automatically ejected from the drive unit housing when a release bar is depressed thereby eliminating the need to provide a large manual retraction opening.

Other objects and advantages of the present invention will no doubt become apparent to those or ordinary skill in the art after having read the following detailed description of a preferred embodiment which is illustrated in the several figures of the drawing.

IN THE DRAWING

DETAILED DESCRIPTION OF THE PREFERRED EMBODIMENT

Figures 1, 2, 3:
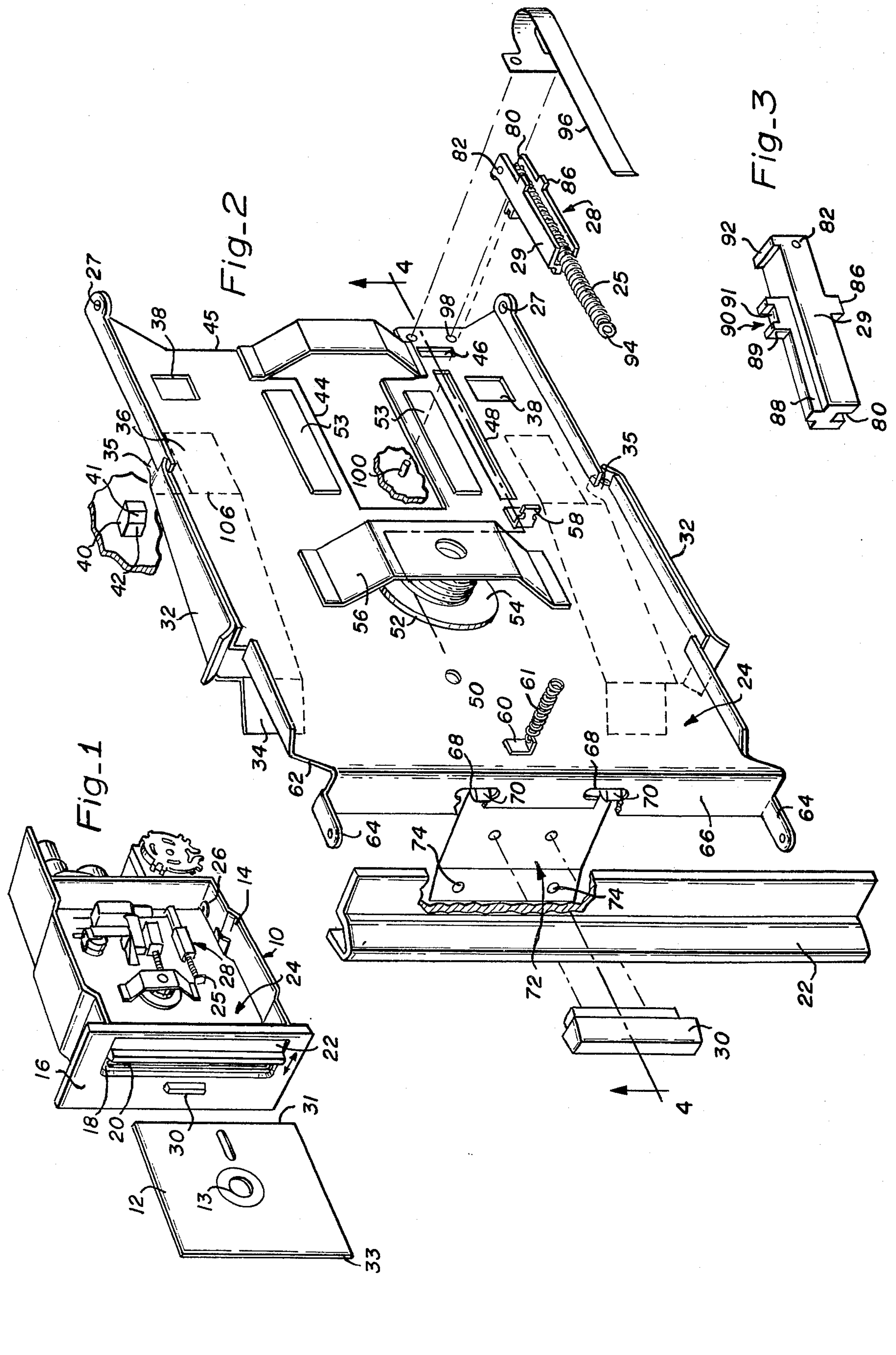
FIG. 1 is a perspective illustration generally showing apparatus in accordance with the present invention.
FIG. 2 is an exploded perspective illustration showing the cartridge guide positioning and ejection mechanism of the embodiment shown in FIG. 1.
FIG. 3 is a perspective illustration showing the cartridge guide engaging side of the ejector shown in FIG. 2.

In FIG. 1 of the drawing a perspective representation of a flexible disk drive apparatus 10 in accordance with the present invention is shown along with a flexible disk 12 for insertion thereinto. The apparatus 10 includes a cast chassis 14 to which is affixed a face plate 16 having a depressed portion 18 provided with a cartridge receiving slot 20. Mounted in sliding relationship within the depressed portion 18 is a closing bar or door 22 which is affixed to a cartridge guide plate 24 by means of tabs which extend through slots in face plate 16. Guide plate 24 is hinged top and bottom to chassis 14 as indicated at 26. Closure bar 22 and guide plate 24 are shown in the open position permitting the cartridge 12 to be passed through the open slot 20.

Guide plate 24 carries a spring loaded cartridge ejector mechanism shown generally at 28 including an ejector block 29 which is engaged by the leading edge 31 of cartridge 12 as the cartridge is inserted through slot 20, and is moved against the force of an ejector spring 25 into a cocked position when cartridge 12 is fully inserted into the apparatus. Once ejector 29 is moved into the cocked position it is prevented from forcing cartridge 12 back toward the slot 20 and closure bar 22 may be moved to the left into the cartridge loaded position.

As closure bar 22 is moved into the closed position it rotates guide plate 24 about the pivots at 26 causing cartridge 12 to be moved into engagement with a cartridge registering means 40 (see FIG. 2) and then into engagement with a drive spindle and record/playback head. In order to release and withdraw cartridge 12 from the drive apparatus 10, a release bar 30 is depressed permitting a spring 61 (see FIG. 2) to return guide plate 24 and closure bar 22 to the illustrated open position thereby exposing slot 20. As guide plate 24 moves away from the loaded position, ejector 29 is released and moves forward to eject cartridge 12 through slot 20.

Referring now to FIG. 2 of the drawing, guide plate 24 and its associated components are shown in exploded detail. As previously indicated, guide plate 24 is hinged to the chassis 14 by pivot pins which extend through the apertures 27 formed in the turned sides of the plate 24. A pair of side edge guides 32 are positioned opposite the cartridge engaging side of plate 24 and have forward portions 34 that are inclined relative to the facing surface of plate 24, and aft portions 36 which are disposed in parallel spaced apart relationship with the facing surface of plate 24. The rearmost edges 35 of guides 32 are flared inwardly to the extent that the separation between the two is equal to the width of the cartridge 12. The separation between portions 36 and the surface of plate 24 is approximately the nominal thickness of the cartridge 12 so as to provide rough alignment of the cartridge as it is received. Guide plate 24 has a pair of rectangular apertures 38 provided in its rearward portion through which extend cartridge positioning projections 40 that form a part of chassis 14 and include precision machined camming surfaces 41 and registering surfaces 42 which are accurately spaced from the drive spindle. Chassis 14 also includes machined side walls (not shown) which are accurately spaced from the drive spindle. When the plate 24 is rotated into the loaded position, machined chassis sidewalls cooperate with the registering surfaces 42 to accurately locate the cartridge relative to the drive spindle.

Figure 4:
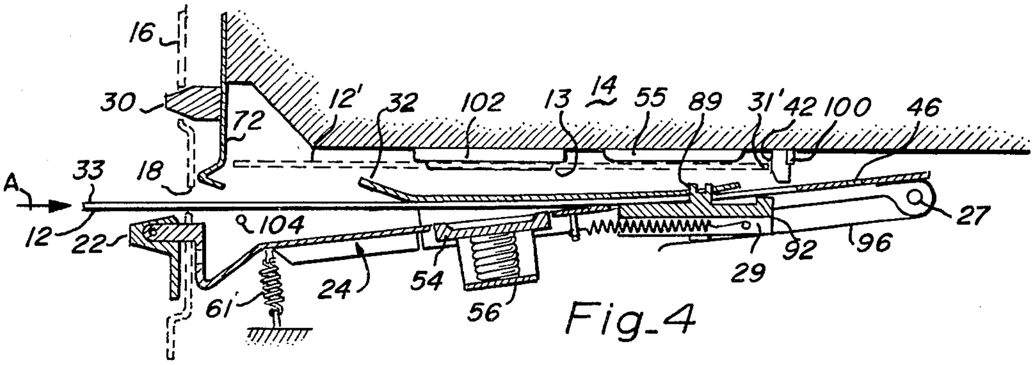
FIG. 4 is a cross-sectional view taken along the line 4—4 of FIG. 2 and schematically illustrating the positioning of the operative components of the present invention in the cartridge loading position.

Guide plate 24 also has a slot 44 extending forward from its rear edge 45 through which recording and playback apparatus extend, and an ejector locking slot 46, an ejector guide slot 48, an indexing aperture 50 and a pressure plate opening 52. In the preferred embodiment, a pair of loading pads are disposed on the cartridge engaging side of plate 24 in depressions 53. These pads are of a resilient material which serves to hold the cartridge secure against ridges 55 (see FIG. 4) in the chassis casting lying therebeneath. A pressure plate 54 is affixed to a bracket 56 and extends into opening 52 to clamp the disc against a drive spindle as will be explained below. The near surface of guide plate 24 also carries an ejector spring anchor 58 and an opening spring anchor 60.

The forward edge portion of guide plate 24 is deformed as illustrated at 62 and terminates in a pair of tabs 64 which extend outwardly through slots (not shown) in face plate 16 and serve as means to which closure bar 22 is attached. The edge portion 66 of guide plate 24 is provided with a pair of latching slots 68 which mate with the latching tabs 70 of a spring latch 72 that is mounted to chassis 14 by means of screws passed through the holes 74. Release bar 30 is affixed to latch 72 by screws passed through the holes 76.

Ejector 29 is an elongated rectangular block having a spring slot 80 on one side which extends longitudinally along the length of the block. A spring anchor pin 82 extends transversely through slot 80 and provides a means to which one end of the ejector spring 25 may be anchored. Projecting laterally from the sides of the block and on each side of slot 80 are a pair of spring engaging slide tabs 86. On the opposite side of the ejector block 29 a guide ridge 88 (see FIG. 3) extends approximately two-thirds of the length of the block and terminates in a laterally projecting ejector foot 89 having a keeper slot 90 formed in its distal end. When moved into position relative thereto, keeper slot 90 mates with a keeper pin 100 projecting outwardly from chassis 14 toward guide plate 24. At the rearmost end of ejector 29 a cocking shoulder 92 is provided.

The ejector 29 is mounted to guide plate 24 by extending guide ridge 88 and ejector foot 89 through guide slot 48, attaching end 94 of spring 84 to tab 58 and fastening a slide spring 96 to guide plate 24 at the holes 98. Spring 96 bears against the tabs 86 to keep the ridge 88 and foot 89 of ejector 29 in slot 48 while at the same time permitting it to move along the slot. Since cocking shoulder 92 extends the full width of ejector 29 and thus is longer than the width of slot 48, ejector 29 will assume a slightly angular disposition relative to the surface of guide plate 24 until it has been moved rightwardly far enough for cocking shoulder 92 to mate with cocking slot 46.

Turning now to FIGS. 4–8 of the drawing, operation of the present invention will be disclosed by way of example using figures which are in the form of simplified cross-sections taken along the line 4—4 of FIG. 2. As previously stated, the primary objective of the illustrated apparatus is to accurately place the cartridge 12 on a drive spindle 102 in the position shown by the dashed lines 12'. In this position the edge 31' is abutted against the precision machined surfaces 41 of projections 40. So positioned, the central aperture 13 of the disc carried within cartridge 12 is placed in precision registration with spindle 102 and is driveably clamped thereto by the pressure plate 54.

Figure 5:
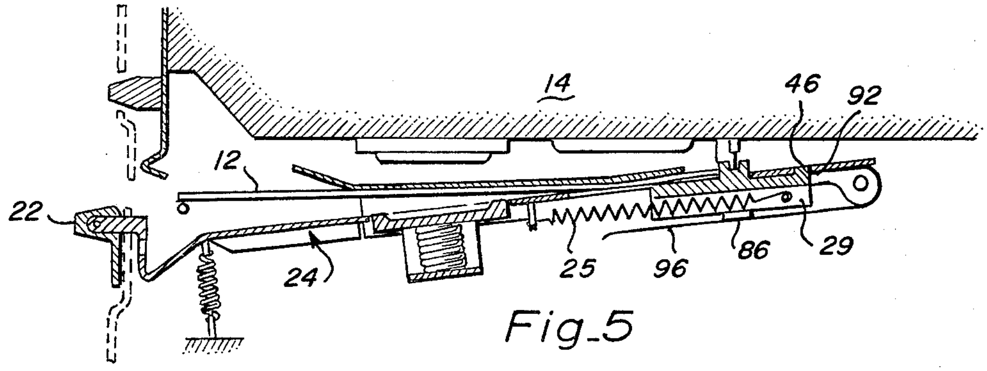
FIG. 5 is a cross-sectional view taken along the line 4—4 schematically illustrating the positioning of the operative components of the present invention in the cartridge inserted, open position.

The positioning of cartridge 12 is accomplished in accordance with the present invention in the following manner: With guide plate 24 biased into the open position by spring 61, closure bar 22 is in the position illustrated exposing slot 18 and permitting cartridge 12 to be inserted into the apparatus. As cartridge 12 is inserted through opening 18 by finger pressure applied to the side 33, indicated by arrow A, it engages guides 32 and guide plate 24 and passes therebetween into engagement with ejector foot 89. Continued movement of cartridge 12 through slot 20 and into the apparatus causes ejector 28 to move rightwardly against the pull of spring 25 until cocking shoulder 92 mates with cocking slot 46 as indicated in FIG. 5. Slot 20 is enlarged at its center (FIG. 1) so as to permit a finger to be inserted therethrough to force cartridge 12 into the cocked position illustrated in FIG. 5.

Figures 6, 7, 8:
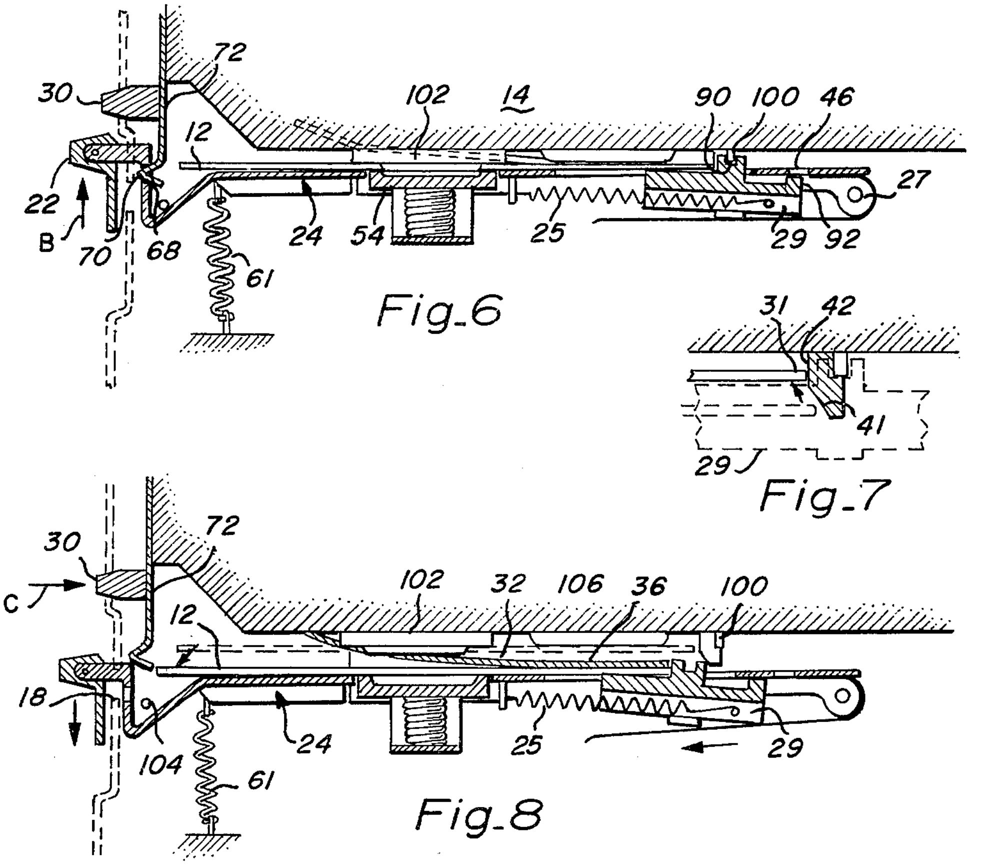
FIG. 6 is a cross-sectional view taken along the line 4—4 schematically illustrating the positioning of the operative components of the present invention in the cartridge loaded position.
FIG. 7 is an enlarged partial cross-secitonal view further illustrating the precision cartridge registration means.
FIG. 8 is a cross-sectional view taken along the line 4—4 schematically illustrating the operative components of the present invention in the cartridge ejecting configuration.

Once cartridge 12 is fully inserted as indicated by the cocking of ejector mechanism 28, closure bar 22 is then moved into the loaded position illustrated in FIG. 6 by finger pressure in the direction indicated by the arrow B, and is maintained in that position by the mating of latch tabs 70 with slots 68. As closure bar 22 is moved into the loaded position it rotates guide plate 24 about the pivots at 27 and translates cartridge 12 into engagement with spindle 102.

Rotation of guide plate 24 about pivots 27 cause three operational events to occur. The first event that occurs is that as cartridge 12 is translated toward spindle 102, its edge 31 engages the camming surface 41 and moves upwardly and leftwardly onto surface 42 thereby accurately positioning cartridge 12 relative to spindle 102. The second event is that as the tip of pin 100 enters keeper slot 90 and strikes the surface 91, it causes the rearmost end of ejector block 29, i.e., shoulder 92, to be lifted out of the cocking slot 46 thereby allowing ejector 29 to move forward under the influence of spring 84 until the portion of foot 89 forming the rearmost edge of keeper slot 90 strikes pin 100 and holds the ejector in that position.

The third event is that as guide plate 24 moves into the operational position illustrated in FIG. 6, pressure plate 54 passes through the central opening in the cartridge 12, engages the Mylar recording disk and presses it into operative engagement with the drive surface of spindle 102.

With cartridge 12 now in the "loaded" record/-playback position, it will remain in that position until release bar 30 is depressed. When bar 30 is depressed, as indicated by arrow C, guide plate 24 is unlatched, as latch 72 deforms inwardly, and swings back toward the open position as indicated by FIG. 8 under the influence of spring 61. As guide plate 24 moves away from spindle 102 carrying cartridge 12 with it due to the engagement of the upper surface by guide portions 36, ejector foot 89 is lifted out of engagement with pin 100 thereby freeing ejector 29 to move leftwardly under the influence of spring 25. Ejector foot 89 then re-engages cartridge edge 31 and drives the cartridge toward and into opening 20. In order to insure that cartridge 12 is properly aligned with opening 20 as it is driven leftwardly by ejector foot 89, a guide pin or rod 104 is positioned inwardly of opening 20. Engagement of rod 104 by the side of cartridge 12 terminates the lateral motion of the cartridge and allows it to be driven into opening 20 by ejector 29.

In the preferred embodiment, the travel of ejector 29 is limited so as to stop short of the angular bend 106 in guides 32 so that the frictional engagement between the internal face of guide portion 36 and the opposing face of guide plate 24 remain in engagement with cartridge 12 and prevent it from being thrown out of opening 20. In other words, the foremost edge of slot 48 is located so as to stop the forward travel of ejector 29 in a position such that the cartridge 12 is not thrown out of opening 20 but is caused to project an inch or so therethrough where it can be easily withdrawn by hand.

Although the present invention has been described in terms of a specific preferred embodiment, it is contemplated that many alterations and modifications thereof will become readily apparent to those having ordinary skill in the art after reading this disclosure. It is therefore to be understood that this disclosure is made for purposes of illustration only and is in no way intended to be limiting. Accordingly, it is intended that the following claims be interpreted as covering all alterations and modifications as fall within the true spirit and scope of the invention.

What is claimed is:

1. In a flexible disk drive apparatus including a chassis, a disk drive means affixed to the chassis, record/-playback means and means for positioning a flexible disk cartridge relative to the drive and record/playback means, an improved cartridge positioning means, comprising:

guide means having a first side pivotally affixed to said chassis and having means for receiving a cartridge inserted on a second side opposite said first side, said guide means being rotatable between a cartridge receiving position and a cartridge loaded position wherein a cartridge disposed in said guide means is moved into engagement with said drive means when said guide means is rotated from said receiving position to said loaded position;

ejector means carried by said guide means and movable along said guide means between a released position and a cocked position, said ejector means being engaged by said cartridge and moved thereby into said cocked position as said cartridge is received by said guide means and being released to eject said cartridge from said guide means as said guide means is rotated from said loaded position to said receiving position; and cartridge registering means affixed to said chassis for engaging an edge of said cartridge as said guide means is rotated into said loaded position, and for moving said cartridge into registration with said drive means.

2. In a flexible disk drive apparatus as recited in claim 1 wherein said guide means includes a generally rectangular guide plate having a surface for engaging one face of said cartridge and means affixed to said guide plate facing said surface for engaging the opposite face of said cartridge to hold said cartridge in sandwiched relationship therebetween.

3. In a flexible disk drive apparatus as recited in claim 2 wherein said guide plate has an elongated slot provided therein extending in the direction in which said cartridge is received, and said ejector means includes an elongated block slideably mating with said slot and means for resiliently biasing said ejector block toward said released position, said guide plate further including means for locking said ejector block in said cocked position after it is moved thereinto by said cartridge.

4. In a flexible disk drive apparatus as recited in claim 3 wherein said means for locking includes a locking edge formed in said plate near one end of said slot, and said ejector block has a shoulder for mating with said locking edge as said ejector block is moved into said cocked position.

5. In a flexible disk drive apparatus as recited in claim 4 wherein said ejector block further includes an ejector foot extending through said slot to engage said one edge of said cartridge.

6. In a flexible drive apparatus as recited in claim 5 and further comprising keeper means affixed to said chassis and operative to engage said ejector block as said guide plate is moved into said loaded position and to disengage said shoulder from said locking edge, said keeper means being further operative to hold said ejector block in a second cocked position until said guide plate is rotated away from said loaded position.

7. In a flexible disk drive apparatus as recited in claim 2 wherein said chassis includes a face plate having a cartridge receiving opening positioned proximate said second side of said guide plate when said guide plate is in said cartridge receiving position, and closure means disposed outside of said face plate and affixed to said second side of said guide plate, said closure means causing said guide means to move into said loaded position when said closure means is moved into position to cover said opening.

8. In a flexible disk drive apparatus as recited in claim 1 wherein said cartridge registering means includes a projection extending from said chassis normal to said guide means when said guide means is in said loaded position, said projection having a camming surface for engaging said cartridge edge and moving said cartridge toward said second side as said guide means is rotated into said loaded position.

9. Flexible disk drive apparatus comprising:

an instrument chassis;

disk drive means affixed to said chassis;

guide means having a first side pivotally affixed to said chassis and a second side opposite said first side for receiving a flexible disk cartridge, said guide means being rotatable between a cartridge receiving position wherein the cartridge is inserted into said guide means and a cartridge loaded position wherein the cartridge is held in operative engagement with said drive means;

cartridge registering means affixed to said chassis for engaging an edge of the cartridge as said guide means is rotated into said loaded position and for moving the cartridge into registration with said drive means; and ejector means carried by said guide means for ejecting said cartridge as said guide means is returned from said loaded position to said receiving position.

10. Flexible disk drive apparatus as recited in claim 9 wherein said ejector means includes a spring loaded ejector block carried by said guide means, said ejector block being engaged by the cartridge and moved relative to said guide means from a released position into a cocked position as the cartridge is received by said guide means, said ejector block being released from said cocked position to eject the cartridge when said guide means is rotated away from said loaded position toward said receiving position.

11. Flexible disk drive apparatus as recited in claim 10 and further comprising latch means for holding said guide means in said loaded position until said latch means is released.

12. Flexible disk drive apparatus as recited in claim 10 wherein said chassis includes a face plate having an opening through which the cartridge is received, said opening being positioned proximate said second side of said guide means, said apparatus further comprising closure means disposed outside said face plate and coupled to said second side of said guide means, said closure means being operative to close said opening when said guide means is in said loaded position and to open said opening when said guide means is in said receiving position.

13. Flexible disk drive apparatus as recited in claim 9 wherein said guide means includes a generally rectangular guide plate having a surface for engaging one side of the cartridge and means affixed to said guide plate facing said surface for engaging the opposite side of said cartridge to hold said cartridge in sandwiched relationship therebetween.

14. Flexible disk drive apparatus as recited in claim 13 wherein said guide plate has an elongated slot provided therein extending in the direction in which the cartridge is received, and wherein said ejector means includes an ejector block slideably mating with said slot and movable between a released position and a cocked position, said ejector block being engaged by the cartridge and moved into said cocked position as the cartridge is received by said guide means, resilient means biasing said ejector block toward said released position, said guide plate further including means for locking said ejector block in said cocked position after it is moved thereinto by the cartridge.

15. Flexible disk drive apparatus as recited in claim 14 wherein said means for locking includes a locking edge formed in said plate near one end of said slot, and wherein said ejector block includes a locking shoulder for mating with said locking edge as said ejector block is moved into said cocked position.

16. Flexible disk drive apparatus as recited in claim 15 wherein said ejector block further includes an ejector foot extending through said slot to engage the cartridge.

17. Flexible drive apparatus as recited in claim 16 and further comprising keeper means affixed to said chassis and operative to engage said ejector block as said guide plate is moved into said loaded position and to disengage said shoulder from said locking edge, said keeper means being further operative to hold said ejector block in a second cocked position until said guide plate is rotated away from said loaded position.

18. Flexible drive apparatus as recited in claim 17 wherein said keeper means includes a stud extending outwardly from said chassis in a direction generally normal to said guide plate when said guide plate is in said loaded position, and wherein said ejector foot includes a receptacle for receiving said stud.

19. Flexible drive apparatus as recited in claim 9 and further comprising a face plate affixed to said chassis and having a cartridge receiving opening proximate said second side of said guide means when said guide means is in said cartridge receiving position, and closure means disposed outside of said face plate and affixed to said second side of said guide means, said closure means causing said guide means to move into said loaded position when said closure means is moved into position to cover said opening.

20. Flexible disk drive apparatus as recited in claim 9 wherein said registering means includes a projection extending from said chassis in a direction generally normal to said guide means when said guide means is in said loaded position, said projection including a camming surface for engaging an edge of the cartridge and for moving the cartridge in the direction of said drive means as the cartridge is moved into said loaded position by said guide means.

* * * * *